May 9, 1944.  L. L. CUNNINGHAM ET AL  2,348,206
CONTROL SYSTEM
Filed May 1, 1940  2 Sheets-Sheet 1

INVENTORS
Lewis L. Cunningham
Homer E. Malone
by W. Tate ATTORNEY.

May 9, 1944.  L. L. CUNNINGHAM ET AL  2,348,206

CONTROL SYSTEM

Filed May 1, 1940  2 Sheets-Sheet 2

INVENTORS
Lewis L. Cunningham
Homer E. Malone
by  ATTORNEY.

Patented May 9, 1944

2,348,206

UNITED STATES PATENT OFFICE 2,348,206

CONTROL SYSTEM

Lewis L. Cunningham, Glendale, Calif., and Homer E. Malone, Milwaukee, Wis., assignors to Perfex Corporation, Milwaukee, Wis., a corporation of Wisconsin Application May 1, 1940, Serial No. 332,674

27 Claims. (Cl. 236—46)

This invention relates in general to control systems and more particularly to heating control systems employing an automatically operated mechanical stoker.

The simplest kind of heating system utilizing a mechanical stoker is that in which the driving mechanism, such as an electric motor, is operated by a thermostat which is situated to sense the temperature of the space to be controlled. In such a system the thermostat serves to cause operation of the stoker when the temperature of the space is below a certain predetermined temperature and to cause operation of the stoker to cease if the temperature of the space is above the desired predetermined temperature.

During severe weather when the heating system must operate a high percentage of the time, such a rudimentary system is satisfactory. However, certain difficulties are encountered if this basic system is used without auxiliary control means during mild weather when the stoker is called upon to operate a relatively small percentage of the time. Under the latter class of operation the stand-by or "off" periods of the stoker are so long in comparison to the operating or "on" periods that the fire burns itself out between successive "on" periods.

The customary method of alleviating this trouble is to provide an electrically operated motor and gear train timing mechanism which intermittently operates the stoker for regular "on" periods at regular "off" periods. In other words, the stoker is automatically operated for a short length of time, for example three minutes, whether heat is required or not, and then allowed to stand by if no heat is required in the system for an "off" period of predetermined length, for example sixty minutes, after which time another automatic "on" period is initiated. In this way fire is maintained in the stoker under all conditions and it is not necessary to frequently rekindle the fire in mild weather.

The primary object of this invention is to provide a heating system incorporating a new and improved means for preventing extinguishment of a stoker fire.

A further object of the invention is to provide a new and improved timer for a stoker system which does not incorporate high speed and consequently quickly wearing parts or gear trains.

A further object is to provide a thermal operated timer which is reliable in operation and economical to build.

A further object is to provide a thermal operated timer whose timing functions are substantially free from variations due to ambient temperature fluctuations.

A further object of the invention is to provide new and improved means for operating a stoker in response to automatic timer operations and in response to the control action of a space thermostat.

A further object is to provide a thermal operated timer which will operate a stoker for predetermined "on" periods at regular predetermined "off" periods.

A further object is to provide a thermal operated timer having adjustable means for regulating the duration of "on" and "off" periods in which the means are so related that the adjustment of one is ineffective on the adjustment of the other.

With the system outlined above, the stoker may be automatically operated by the timer just subsequent to an operation in response to a call for heat by the room thermostat in the space to be heated. If this condition exists the stoker will run for a length of time equal to the "on" period of the timer after the stoker has been running a relatively long time in response to the room thermostat. Such an automatic operation at this time is not required to prevent the fire from becoming extinguished, and therefore serves only to cause "over-shooting" of the temperature in the space being heated.

Certain devices have been incorporated in heating systems of the kind described to prevent such successive operations of the stoker. These devices are commonly referred to as "skip cycle" devices and in at least one form of device the timing mechanism is so arranged that after a stoker operation from the room thermostat a full timer "off" period must elapse before a timer "on" period may be initiated.

A further object of the invention is to provide means for interposing delay between operation of a stoker in response to room thermostat action and operation in response to an automatic timer operation.

Other objects and advantages reside in certain novel features of construction, arrangement, operation and combination of the parts and circuits which will be hereinafter more fully described in the specification, and particularly pointed out in the appended claims, and of which the preferred embodiments are illustrated in the accompanying drawings.

In the drawings:

Fig. 1 is a plan view showing a timing device of the invention.

Fig. 2 is an elevation in partial cross-section taken along the line 2—2 of Fig. 1, but shows the arrangement of the parts at a different time during the operation of the timer.

Fig. 3 shows the relation of some of the parts of Fig. 1 at a certain time during the operation cycle of the timer.

Fig. 4 shows the operation of some of the parts of Fig. 1 at another time during the cycle of operation of the timer.

Fig. 5 shows the relation of the parts of Fig. 1 at a third time during the cycle of operation of the timer.

Fig. 6 shows the relation of other of the parts of Fig. 1 at a fourth time during the cycle of operation of the timer.

While the invention is susceptible of various modifications and alternative constructions, the drawings shown and the description herein illustrate the preferred embodiments. It is to be understood, however, that there is no intention to limit the invention to the specific forms disclosed, but rather to cover all modifications and alternative constructions falling within the spirit and scope of the invention.

Generally stated, the invention contemplates the incorporation of a thermally operated timer in a stoker fired heating system so as to prevent extinguishment of the fire. In the exemplary forms illustrated in the drawings, the invention is embodied in a stoker-fired burner system having a stoker timer wherein an electro-thermal actuator is operable to slowly actuate a switch-controlling member back and forth to control its own energization in such a manner as to sustain the oscillatory motion, and in this oscillation the switch-controlling member is operable to control the energization of the stoker in a prescribed manner. The electro-thermal actuator of the timer is arranged to impart motion to a switch arm in a particular manner in order to best utilize the "time-motion" characteristics of the actuator in measuring the desired "on" and "off" periods of the stoker.

Figure 7:
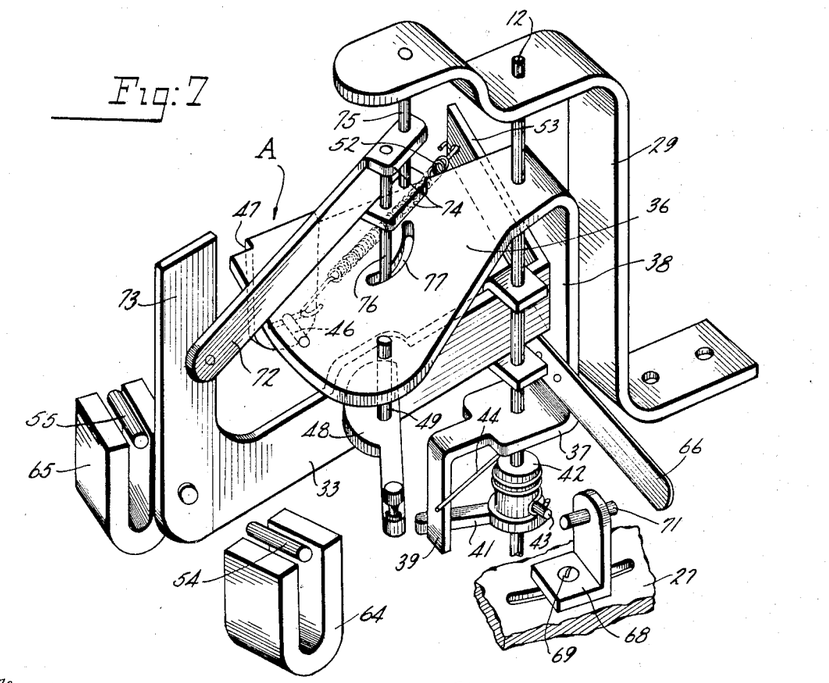
Fig. 7 is an isometric view of the control mechanism shown in Fig. 1 modified somewhat for the sake of clarity.
Figure 8:
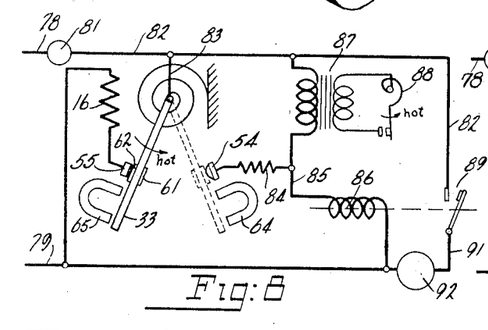
Fig. 8 is a wiring diagram of the component parts of a heating system embodying the invention.
Figure 10:
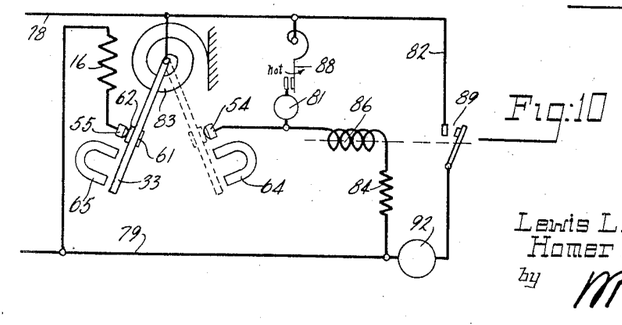
Fig. 10 is a modification of the system shown in Fig. 8.

Two alternative embodiments of the stoker-fired burner control system of the present invention are illustrated in Figs. 8 and 10 of the drawings and each of these two burner control systems embodies a stoker timer, the constructional and operational features of which are illustrated in detail in Figs. 1 to 7.

As shown in Figs. 1 and 2 of the drawings, the timer comprises a thermal actuator such as the spirally-shaped bimetal actuator 11 which has one end securely fastened as by spot-welding to a condition transmitting member such as the shaft 12. The other end of the spirally-shaped actuator 11 is secured to a relatively stationary support such as the metallic ring 13 by means of a pin 14 passing through an aperture 15 in the spirally-shaped actuator 11 and driven into a suitable opening in the metallic ring 13. Motivating means for the actuator such as the heater resistance 16 is placed in the vicinity of the actuator 11 for heating the same to cause rotation of a shaft 12. The resistance 16 is supported upon a suitable means such as the insulated bobbin 17 and is insulated from the surrounding structure by insulators 18 and 19. Means having relatively high thermal inertia is associated with the spirally-shaped bimetallic element 11 and the heating resistance 16 such as the cast housing 21. The heater resistance 16 is secured in relatively intimate contact with the housing 21 by means of clamping it between the metallic ring 13 and the housing 21. Screws 22 passing freely through the metallic ring 13 and screwed into the housing 21 serve to provide the necessary clamping force to secure the heater 16 in correct position.

Means are provided for confining the heat produced by the heater resistance 16 to a zone in the immediate vicinity of the spirally-shaped actuator 11 such as the housing cover plate 23 together with the cover insulating washer 24. Spacing members 25 and 26 serve to secure the housing cover plate 23 to the housing 21 by passing through the cover plate 23 and threading into the housing 21. The spacers 25 and 26 additionally provide means for spacing the housing assembly from, but securing it to, the insulated panel 27. The shaft 12 is journaled near the junction point of the spirally-shaped actuator 11 by means of an aperture 28 in the cover plate 23. The other end of the shaft 12 is journaled in an aperture in a hanger 29 supported in cantilever fashion to the panel 27 by means of screws 31 and a two-holed nut 32. An oscillating control member such as the switch arm 33 is freely pivoted to the shaft 12 by means of turned up ears 34 and 35. An oscillating actuator for the switch arm 33 is additionally freely pivoted to the shaft 12, and as herein shown this oscillating actuator comprises a first driver member A formed in the general shape of a U having driver sides 36 and 37 and a base 38. A portion of the driver side member 37 is turned down at right angles to the remainder of the side so as to form a projecting driver lug 39. The driver lug 39 is arranged to protrude through an arcuate slot 40 in the panel 27. The driver member A is motivated by the actuator 11 through a strain release means which as herein shown comprises an arm 41 having one end engaging the lug 39 and secured at the other of its ends to a hub 42 which in turn is fixed to the shaft 12 by means of screws 43. A helical spring 44 is wrapped around the hub 42. One end of the spring is secured to the screw 43, while the other end is arranged to bear against the lug 39 so as to bias lug 39 against arm 41. A projection 45 integral with the hub 42 is provided to space the driver side 37 from the arm 41. The projection 45 passes loosely through a suitable aperture in the panel 27.

Suitable lost motion engaging means is provided between the driver A and the switch arm 33 whereby the switch arm 33 is oscillated back and forth by the driver. This lost motion engaging means comprises a first means for engaging and motivating the switch arm 33 in a counter clockwise direction and a second means for engaging and motivating the switch arm 33 in a clockwise direction. The first means is shown as a driver stop screw 46 secured to the driver member by threading through a driver ear 47 bent down at right angles to the plane of the driver side 36 and adapted to engage the switch arm. The second means is shown as an "on" period adjusting cam 48 pivotally supported on the driver side 36 by means of pivot pin 49 passing fully through the cam 48 and riveted to the driver side 36. A friction washer 51 is provided between the cam and the driver side to prevent the cam 48 from rotating from the position at which it is set except by manual manipulation.

Means such as the biasing tension spring 52 are provided to bias the switch arm 33 toward the "on" period adjustment cam 48 in a counter clockwise direction relative to the driver A for reasons which will be pointed out hereinafter. One end of the tension spring 52 is connected to the switch arm 33 by means of a projection 53 therefrom. The other end of the spring 52 is connected to the driver A as by attaching to the driver ear 47 by passing through an aperture therein.

Suitable stops are provided for the switch arm 33 so as to limit its oscillating motion. These are shown as a counter clockwise stop contact screw 54 and a clockwise stop contact screw 55. The contact screws 54 and 55 are mounted on the panel 27 in any suitable way as by means of supports 56 and 57. A pair of resilient blades 58 and 59 are suitably secured to the switch arm and carry contact buttons 61 and 62 for the purpose of accomplishing certain switching functions in conjunction with the contact screws 54 and 55. It is preferable to insulate the resilient blades 58 and 59 from the switch arm 33. This may be done by a pair of insulating strips 63 lying on each side of switch arm 33 as shown in Figs. 1 and 2. Figs. 3, 4, 5 and 6 show the blades as being directly connected to the switch arm merely to simplify the illustrations.

Suitable means are associated with each contact screw 54 and 55 to bias the switching arm 33 toward that contact screw. Such means are shown as a permanent magnet 64 associated with the contact screw 54 and a permanent magnet 65 associated with the contact screw 55. The permanent magnets 64 and 65, the resilient blades 58 and 59, the tension spring 52 and the bimetal actuator 11 cooperate to render first, the action of the cooperating contacts 61 and 54, and 62 and 55 snap acting to insure good switch action, and second, to render the motion of the switch arm 33 snap acting in a particular manner to accomplish a prescribed control function as will be more fully explained hereinafter.

As may be seen from the description thus far, when the bimetal actuator 11 is subjected to a change in temperature condition by energization or de-energization of the heater 16, the driver A is moved backward and forward, and the motivating effort of the bimetal actuator is applied to the driver through the strain release members 41, 42 and the driver lug 39. The bimetal actuator 11 serves as the actuating or driving member and the driver A serves as the driven member or load. The driver A "loads" the actuator to the extent of the load upon it. This load normally, in addition to the friction load of the pivoting journals, consists of the load encountered in actuating the switch arm 33 back and forth between the contact screw stops 54 and 55. This may be termed the real or useful load. In addition to this real load, means are provided to introduce artificial load in order to change the condition of the actuator required to result in movement of the driver to a prescribed position and hence to change the time required for this function as will be hereinafter described. Means for introducing such artificial load are shown as the cantilever spring 66 suitably secured to the driver base 38 as by means of rivets 67 and its associate adjustable abutment shown as the support 68 adjustably secured to the panel 27 by adjusting screw 69 and stop screw 71 threaded through said support 68.

For reasons which will be more fully described hereinafter, a second oscillating actuator such as a second driver 72 is associated with the first driver A and is adapted to engage the switch arm 33 at the tip of an upward extension 73 at the outer extremity of the switch arm 33. Ears 74 integral with the second driver are turned over to serve as journal bearings for a pivot pin 75 which is riveted to the hanger 29. An actuating pin 76 is fixed in the ears 74 at a point somewhat remote from the pivotal axis of the pivot pin 75. This actuating pin 76 extends from the bottom of the second driver 72 into an arcuate cam slot 77 in the first driver A, the arrangement being such that when the first driver A oscillates back and forth the sides of the arcuate slot 77 engage the actuating pin 76 and cause the second driver 72 to oscillate back and forth. The pivot axis of the second driver 72 is remote with respect to the pivot axis of the first driver A and the actuating pin 76 of the second driver 72 is so situated that the rate of oscillatory movement of the second driver 72 is much greater than that of the first driver A. The function of this second driver 72 will be more fully explained hereinafter, but to digress a moment it may be said that the second driver 72 serves to take control over the switch arm 33 independent of the controlling action of the "on" period cam 48 of the first driver A when the switch arm 33 is being returned to its most clockwise position, in order that the "off" period timing will be substantially constant regardless of the setting of the "on" period cam.

In the stoker control system of Fig. 8 the timer is shown diagrammatically with its switch arm 33 in two of its positions. The solid lines designate the extreme clockwise position where the switch arm contact blade 59 is in contact with the contact stop 55 and the dotted position designates the extreme counterclockwise position where the contact blade 58 is in contact with the contact stop 54. Conductors 78 and 79 designate conductors connected to the electric service main. 81 is a limit control such as is ordinarily used in automatic heating systems. It may be responsive to either pressure temperature or to any other suitable physical condition. Fig. 8 shows this limit control 81 to be in full command over the entire system and to cause absolute shut-down of the system in the event that conditions are in excess of the value for which the limit control 81 is set. Fig. 10 shows the limit control 81 in a different branch of the heating system circuit in order to effect a different mode of operation as will be explained hereinafter.

Referring to Fig. 8, conductor 82 is connected to conductor 78 through the limit control 81 and serves as a feeder for several branch circuits. One of these circuits partially extends from the conductor 82 through the switch arm 33 by means of the conductor 83 connecting the two together. If the switch arm is in the clockwise position as shown, a circuit extends through the clockwise contact stop 55, through the heater 16, to the other service conductor 79. If the switch arm 33 is in the counterclockwise position, the circuit extends through the counterclockwise contact stop 54, a ballast resistor 84, a conductor 85, an electro mechanical device such as a relay coil 86 to the other service conductor 79. Thus it will be seen when the switch arm 33 is in the clockwise or timer control position the heater 16 will be energized, whereas when the switch arm 33 is in the counterclockwise or burner control position the heater 16 will be de-energized and the relay 86 will be energized.

An impedance transfer device such as a transformer 87 having a primary and secondary has one of its primary leads connected to the feeder connector 82 and the other of its primary leads connected to the conductor 85 at the junction of the ballast resistor 84 and the relay coil 86. A secondary of the transformer is arranged to be shunted by means of a physical condition responsive means such as the space thermostat 88 located in a space to be controlled. Another circuit extends from the feeder conductor 82 through the relay switch contacts 89, through conductor 91 to the motor 92 of the stoker to be controlled and thence to the other service conductor 79. Through this circuit power is supplied to the stoker motor 92 whenever the relay contacts 89 and the limit control 81 are closed.

The stoker control system illustrated in Fig. 10 is basically identical with Fig. 8 but the circuit position of the ballast resistor 84 is changed and the space thermostat 88 is arranged to directly control the relay circuit rather than to indirectly do so through an impedance transferring device such as the transformer 87 shown in Fig. 8.

Operation

Referring now particularly to the mode of operation of the timer, assume that all parts are at room temperature. Under these conditions thee bimetal actuator 11, because of prior operation, will have rotated the shaft 12 to its extreme clockwise position and the strain release arm 41 will have moved away from the driver lug 39 limiting the stress on both the actuator 11 and the driver A to that produced by the rotating effort of the helical spring 44. Above the panel 27 the parts will assume the positions shown in Fig. 1 with both the switch arm 33 and the drive A in their extreme clockwise positions and with the contact button 62 engaging the contact stop screw 55.

When the device is first connected to the electrical service main, the limit control 81 being closed, current will flow from the conductor 78, through the limit control 81, the conductor 82, the conductor 83, the switch arm 33 (actually resilient contact blade 59), the contact button 62, the contact stop screw 55, the heater 16 to the other service conductor 79. This current flow energizes and causes the heater 16 to increase its temperature. This in turn causes the bimetal actuator 11 to heat and effects a counterclockwise rotary motion of the shaft 12. Inasmuch as considerable mass is associated with the heater 16 in view of the massive housing 21, the temperature conditions within the bimetal actuator enclosure increase very slowly. After some lapse of time the strain release arm 41 engages the driver lug 39 and causes the driver A to slowly rotate about the axis of shaft 12 in a counterclockise direction. As soon as the driver A starts to rotate, the "on" period adjusting cam 48 moves away from the switch arm 33, since while the tension spring 52 biases the switch arm 33 in a counterclockwise direction with respect to the driver A, the magnetic effort of the permanent magnet 65 tends to bias the switch arm 33 in a clockwise direction and the latter being of predominating magnitude restrains the switch arm 33 in a position against contact stop 55. After some length of time the driver A rotates sufficiently to cause engagement of the driver stop screw 46 with the switch arm 33. When this position is reached, the driver A will cease further motion for an interval of time while the bimetal actuator 11 continues to heat and stores up energy. After some further length of time sufficient effort will have been built up in the actuator 11 in a counterclockwise direction against the switch arm 33 to overcome the clockwise restraining effort of the magnet 65 on the switch arm 33. Immediately thereafter the switch arm 33 will snap in a counterclockwise direction from its position against the contact stop screw 55 to a position against the stop screw 54. That is, it will traverse the gap between the contact screws 55 and 54 in one full snap.

Fig. 3 shows the position of the parts immediately preceding the snapping operation described above while Fig. 4 shows the arrangement of the parts just subsequent to the snap. Inasmuch as the effort deflection characteristics of the magnet 65 and the biasing spring 52 are diametrically opposite and correctly proportioned, the switch arm 33 will snap away from the magnet 65 under the influence of the bias spring 52, as soon as the arm 33 is moved slightly away from its stop position proximate to the magnet 65. At the time the switch arm 33 snaps into engagement with contact 54, the driver A has rotated to a position in which a gap is present between the switch arm and cam 48. Thus initial clockwise motion of driver A merely closes the gap without actuating the switch arm.

As soon as the switch arm 33 moves away from the contact stop screw 55 as described above, the circuit to the heater 16 is broken and the heater begins to cool, causing the clockwise rotation of the driver A. As the driver moves in a clockwise direction in response to the cooling of the bimetal actuator 11, this gap diminishes and finally completely closes. Immediately following the closure of this gap the driver A stops its rotation while the bimetal actuator 11 builds up sufficient effort to overcome the magnetic attraction the permanent magnet 64 has for the switch arm 33. When sufficient effort has been built up to overcome this force, the switch arm 33 snaps away from the magnet 64, the snap in this case being derived from the resiliency of the actuator cooperating with the peculiar attraction properties of a permanent magnet.

Referring to Fig. 8, it will be noted that while switch arm 33 is in its most counterclockwise position against the stop screw 54 a circuit is established extending from service conductor 78, through limit control 81, conductor 82, conductor 83, switch arm 33 (actually resilient blade 58), contact stop screw 54, ballast resistor 84, conductor 85, relay coil 86, to the other service conductor 79. While this circuit is closed the relay coil 86 is energized and its contacts 89 are engaged. The relay contacts 89 being engaged, close a circuit for the stoker motor 92 extending from service conductor 78 through limit control 81, conductor 82, relay contacts 89, conductor 91, stoker motor 92, to the other service conductor 79. Thus it will be seen that while switch arm 33 is in its position against the contact stop screw 54 the stoker will operate, and when it is not in such a position the stoker will not operate (except in response to the space thermostat 88 which will be more fully described hereinafter).

The length of time that the switch arm 33 is in this counterclockwise or burner control position determines therefore the length of "on" period, and this in turn is determined by the length of time it takes for the "on" period cam 48 to move from its most counterclockwise position to a position against the switch arm 33 with sufficient effort to disengage switch arm 33 from contact with contact stop screw 54.

It will be seen that when the driver and the switch arm 33 are both in their most counterclockwise positions, the gap between the engaging portion of the "on" period cam 48 and the switch operating arm 33 is a certain amount. This amount of gap may be increased by rotating the 'on" period cam 48 in a clockwise direction about its pivot pin 49. By adjusting the size of this gap by such rotation the "on" period is changed inasmuch as the deflection required, and hence the length of time required, for the driver A to rotate a sufficient amount to engage the cam 48 with the switch arm 33, is changed. In other words, the "on" period is determined substantially by the length of time required for the driver A to move from its most counterclockwise position to a position where the cam 48 engages the switch arm 33, and as the amount of deflection required to accomplish this is varied so the length of "on" period is varied, the time required for a deflection being a direct function of the amount of the deflection.

It will be noted that when the switch arm 33 snaps away from the magnet 64 in a clockwise direction it snaps but a short distance away from the magnet 64, because when travelling in this direction there is only the resiliency of the bimetal actuator 11 to move the switch arm 33 away from the magnet 64. This should not be confused with the magnitude of the snap in the counterclockwise direction where the switch arm 33 snaps all the way across in view of additional resilient action of the biasing spring 52.

Now assume for the moment that the second driver 72 were removed. If this were true, the "on" period cam after disengaging the switch arm 33 from the contact stop 54 would continue to rotate the switch arm 33, remaining in engagement with it until the switch arm 33 approached the immediate vicinity of the magnet 65; the switch arm 33 and the driver A rotating together as a unitary structure. Under these conditions when the switch arm 33 came within the immediate vicinity of the magnet 65 the magnetic attraction in opposition to the resilient effort of the tension spring 52 would cause the switch arm 33 to snap in a clockwise direction to engage the contact stop screw 55 and consequently close the circuit extending through the heater 16. Upon the heater 16 again being energized, the bimetal actuator would again deflect in a counterclockwise direction causing the driver A to again start the cycle described above.

It will be noted, however, that when the bimetal actuator 11 is energized after one cycle has been traversed the temperature thereof is not room temperature but is somewhat elevated above it. After one cycle has been traversed the strain release arm 41 does not leave the driver lug 39. The strain release is only provided to take care of the transient condition to which the device is subjected when first installed or after a power failure or limit control operation when the limit control 81 is in the circuit position indicated in Fig. 8.

After the control has gone through the first cycle the bimetal actuator 11 operates within two temperature limits, the lower limit being the temperature required to cause the switch arm 33 to just close the contacts at contact stop 55 when returning to this position after an excursion away from it; and the upper limit being the temperature required to bring the stop screw 46 in engagement with the switch arm 33 with sufficient effort to cause the switch arm 33 to snap away from the magnet 65. If the "off" period of the timer be defined as the length of time expiring between two automatic "on" periods, it will be seen that this "off" period corresponds to the length of time required for the switch arm 33 to move in a clockwise direction away from the magnet 64 toward the magnet 65 and then again to return to the magnet 64. In terms of temperature of the bimetal actuator 11 the "off" period will initiate at a temperature almost, but not quite, the maximum temperature of the bimetal, will continue on while the bimetal temperature decreases and then again increases, and will terminate when the bimetal temperature reaches its maximum. The interval between the maximum temperature of the bimetal and the point described as "almost maximum" above, being the "on" period.

In terms of the driver motion the "off" period corresponds approximately to the length of time required for the driver A to move from its extreme counter clockwise position to its extreme clockwise position and return. This in turn is governed by the rate of cooling and heating of the bimetal actuator 11.

As was set forth above, the bimetal actuator 11 can only heat while the switch arm 33 is in engagement with the contact stop 55. Consequently, if means were provided to lengthen the time for the driver A to return the switch arm 33 to its clockwise position, then the length of time expiring during the "off" period would also be increased. The cantilever spring 66 serves as the means to this end. So long as the cantilever spring 66 oscillates back and forth with the driver A without encountering any obstruction which will set up a restraining force, the driver A oscillates as described above. Under these conditions the load on the bimetal actuator 11 is the load transmitted through the driver and is made up of the various friction loads of the pivots plus that required to oscillate the switch arm 33. This may be said to be the active load. Now, artificial load is placed upon the actuator if an obstruction such as the stop screw 71 is placed in the path of the cantilever spring 66 so that the spring 66 must strike this abutment somewhere near the terminal portion of the clockwise motion of the driver A. With this artificial load on the actuator 11, in order that the driver member A may be rotated to a position sufficient to close the contacts at contact stop 55, bimetal actuator 11 must be at a somewhat lower temperature than it would be if the artificial load were absent. This necessarily results since the bimetal actuator 11 is a resilient member and in order to produce any motion it must internally stress itself, and consequently the greater the load upon the actuator the greater it must stress itself in order to produce a given deflection. It will be seen that as the stop screw 71 is moved in a counter clockwise direction so that the spring 66 engages it at an earlier point in its counterclockwise direction of travel, the bimetal actuator 11 must stress itself to a greater extent in order to return the switch arm 33 to its circuit closing position in contact with the contact stop 55. It follows in consequence of such adjustment of stop 71, that the bimetal actuator 11 must cool to a lower temperature to produce this greater stress with which to effect closure of the above contacts and that further the length of time required for such cooling will necessarily lengthen. Also, since the temperature of the bimetal at the time of closing of the contacts at contact stop 55 is lower when the stop screw 71 engages the cantilever spring 66, than it would be if the stop screw 71 would not engage the spring 66, the length of time required for the driver A to move from the position shown in Fig. 1 to the position shown in Fig. 3 will be increased. This increase will be equal to the length of time required for the bimetal temperature to increase from its now lower temperature to the temperature it would have had at the time of closing of the contacts at contact stop 55, in the absence of engagement of the cantilever spring 66 with the stop screw 71. In other words, by moving the support 68 so as to cause engagement of the stop 71 with the cantilever spring 66 at an earlier or later time the lower temperature limit the bimetal actuator 11 must reach during a complete cycle of the timer is decreased or increased respectively. By decreasing this lower limit time is added to the "off" period during a portion of both the cooling and the heating cycles of the bimetal actuator 11. Suitable reference marks are engraved on the panel 27 opposite the support 68 in order that the stop 71 may be set to effect any desirable length of "off" period within the range of the instrument.

The reason for the second driver member 72 will now be explained. In the description above the function of the arm 72 was completely eliminated in order to more clearly set forth the basic idea upon which the timing device operated. For reasons now to be advanced it will be seen that it is desirable that some means be introduced in order to render the "off" period timing substantially constant as the "on" period timing is adjusted by means of manual manipulation of the "on" period cam 48. As was stated above, when the "on" period cam 48 is rotated in a clockwise direction the gap between the engaging edge of the "on" period cam 48 and the switch arm 33 is increased (when the parts are in the position shown in Fig. 4.) This is done in order that the driver A be made to rotate a greater number of degrees in a clockwise direction from its extreme counterclockwise position before the switch arm 33 is disengaged from contact stop 54. While this accomplishes the desirable function of increasing the "on" period timing by changing the relative position of the driver A with respect to the switch arm 33 at that time in the cycle, it also changes the relation between the driver A and the switch arm 33 at every other position of the parts. Consequently if the switch arm 33 were to be returned to its position against the magnet 65 solely by the action of the "on" period cam 48, the extreme clockwise position of the driver member A would be materially changed. This change would vary with the setting of the "on" period cam.

If no additional structure were used, as the "on" period cam 48 is rotated clockwise the temperature of the bimetal actuator 11 to effect closure of the contacts at contact stop 55 would decrease and consequently the "off" period would be altered in much the same way as it is by introducing artificial loading. In order to prevent this undesirable result the present invention provides means to insure that the temperature of the bimetal actuator 11 at the time of closure of the contacts at the contact stop 55 will be substantially constant for any given setting of the "off" period adjuster independent of any setting of the "on" period adjuster.

As was set out hereinbefore, the second driver 72 is operated directly by the movements of the driver A but is adapted to oscillate back and forth at a higher rate of movement than is the driver A. In order to render the "off" period timing constant, it is apparent that it is immaterial what the characteristics of the motion of the switch arm 33 are during its clockwise movement from magnet 64 to 65, but that it is material that the switch arm 33 be ready to snap to its contact closing position against the contact screw 55 when the driver A is in a certain position in space. This position corresponds to a definite temperature of the bimetal actuator 11 and is almost, but not quite, the extreme clockwise position the driver A would assume were the "on" period adjustment cam 48 set at the minimum "on" period setting. It is the function of the second driver 72 to have the switch arm 33 in a position ready to snap against contact stop 55 when the driver A reaches this defined position, and to accomplish this irrespective of the position of the "on" period cam 48. If the second driver 72 is so arranged that it just engages the switch arm 33 at this position of the driver A when the "on" period cam is set at its minimum position, the desired control function set out above will follow.

With this arrangement of the parts, it might be said that the second driver 72 becomes the controlling member in returning the switch arm 33 to its contact closing position against the contact stop 55. If the "on" period adjustment cam 48 is rotated so as to produce a longer "on" period timing the position of the driver A at the time of closure of the contacts at contact 55 does not change. This is true since irrespective of the position of the cam 48 the second driver 72 will always be in a position to close the contacts at the contact stop 55 when the driver A reaches a position corresponding to the correct closure point of these contacts. As the "on" period cam 48 is adjusted the second driver 72 will "pick up" or engage the switch arm 33 at an earlier or later time in its return movement toward magnet 65, but switch arm 33 will always be in a position ready to snap toward magnet 65 when driver A reaches its appointed position in space. As the "on" period adjustment cam is regulated for increasingly greater lengths of "on" period timing the second driver 72 "picks up" or takes over the return motion of the switch arm 33 at successively earlier times in the return travel of the switch arm 33 toward the magnet 65. Where the second driver 72 picks up the switch arm 33 is of course immaterial, the only material factor being that the switch arm 33 be in circuit-closing position with respect to contact stop 55 when the driver A rotates to certain position in space as defined above.

As far as this return function of the second driver is concerned, it is immaterial as to what the actual rate of motion is so long as it is not less than the rate of motion of the driver A. But it will be seen upon further examination of the structure that the second driver 72 must oscillate at a greater rate than that of the driver A for another reason, namely, that there be no obstruction in the path of the switch arm 33 when it is ready and in a position to snap from magnet 65 to magnet 64 under the action of the stop screw 46.

The relation of the second driver 72 with respect to the other members of the structure may perhaps be best seen by reference to Fig. 6 which shows the second driver 72 in position just subsequent to taking the controlling function, over the switch arm 33, away from the "on" period cam 48 and just prior to the snap of the switch arm 33 to its circuit closing position against contact stop screw 55. It will be seen that the second driver 72 in this instance takes over the controlling function so late in the return cycle of the switch arm 33 because the "on" period adjustment cam is in almost its minimum "on" period adjustment position. If the "on" period adjustment cam were in a position to render longer "on" periods the second driver would assume its control action earlier in the return cycle.

It is to be understood that after the bimetal actuator 11 has gone through one complete cycle it operates between two temperature limits which are substantially greater than ambient temperature. While the lower limit temperature varies depending upon the "off" period adjustment, both limits always remain substantially above ambient temperature. As a result variations in room temperature of reasonable magnitude do not appreciably affect the time required for the bimetal actuator 11 and its associate housing to change from the lower limit to the high and vice versa. That the above should be true follows from the fact that a relatively high percentage change of temperature at the ambient temperature becomes only a relatively small percentage change at an elevated temperature.

While the relay 86 of the stoker control system of Fig. 8 is energized for regular "on" periods at regular "off" periods in response to the action of the timer as described above, it may also be energized at any time in response to the action of the space thermostat 88 irrespective of the control action of the timer. When the space thermostat contacts close, the secondary of the transformer 87 is short circuited. This reflects or transfers a low impedance into the primary circuit and effectively electrically places the relay coil 86 across the conductors 82 and 79 in series with the internal impedance of the transformer 87 as it appears from the high voltage winding, energizing the relay and causing the stoker motor 92 to operate the mechanical stoker.

With the circuit shown in the Fig. 8, the thermostat 88 and the timer, control the stoker motor 92 independently of each other (with the exception that if either device is in a position so as to operate the motor 92 the other of the devices cannot interrupt this operation). It is obvious with this class of operation that the timer may automatically cause the stoker to operate in any conceivable time sequence subsequent to an operation by the space thermostat 88 so that it is possible that a timer initiated "on" period may occur directly after or a short time after the room thermostat 88 has caused the stoker to operate. Inasmuch as in some types of heating systems this may produce objectionable overshooting, it is desirable to correlate the operation of the timer and the thermostat to produce a skip-cycle mode of operation.

Figure 9:
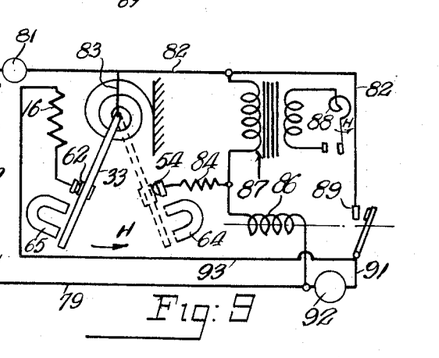
Fig. 9 is a simplified schematic of the circuit shown in Fig. 8.

In the instant device the mode of operation of the timer may be changed to produce the skip-cycle effect by changing the heater lead by connecting the heater 16 to the conductor 91 rather than to the conductor 79. This change is indicated in Figure 9. With the circuit so rearranged it will be seen that the heater 16 cannot be energized unless the relay contacts 89 are in the open position and that then the energization is through the stoker motor 92. With this arrangement when the space thermostat 88 causes the relay coil 86 to close contacts 89 the heater 16 cannot be energized by closure of the contacts at contact stop 55. As the result, when the room thermostat 88 calls for heat the heater 16, and consequently the bimetal actuator 11, will commence to cool or will continue to cool, depending upon the location of the switch arm 33. If, for example, the switch arm 33 were just on the verge of snapping from its position against the magnet 65 to its position against the magnet 64 so as to initiate a timer "on" period and if at this instant the room thermostat closed its contact so as to operate the stoker, the arm 33 would not snap because the slight amount of additional heat required to produce the last small increment of effort in the bimetal actuator would not be forthcoming, as a consequence of deenergization of the heater 16. Now all during the operation of the stoker in response to the space thermostat's call for heat the bimetal actuator and its associate housing will cool. The length of time this cooling operation continues depends upon the length of time that the burner operates. As soon as the thermostat 88 opens its contacts the heater again energizes and the length of time required for the driver A to again be in a position to actuate the switch arm 33 from its position against magnet 65 will be approximately equal to the length of time that the room thermostat was operating the stoker. That the delay time and the period of operation caused by the thermostat should be approximately equal is due to the fact that the rate of heating and cooling of the bimetal actuator and its associate housing is substantially the same. Of course, if the period of operation of the stoker by means of the room thermostat is of such duration that the bimetal actuator and its associate housing substantially assumes room temperature, the time delay introduced after a thermostat operation will be that length of time required to heat the bimetal actuator and its housing from room temperature to the temperature required to effect actuation of the switch arm 33 in a counter-clockwise direction as described in the opening paragraphs of this discussion relative to the operation of the timer. It is also obvious that if the operation of the stoker by the room thermostat exceeds the length of time mentioned immediately above, the delay time after such operation will be constant.

It will be noted that with the wiring illustrated in Figures 8 and 9 the limit control 81 is in series with the entire control system. Consequently, when this control opens its switch due to the temperature or pressure becoming too high, the timer is incapable of operating the stoker. In addition, the heater 16 at such time is deenergized which assures that the timer will not operate the stoker for a substantial period of time after the limit control recloses its circuit. If this result is not desirable or necessary, the limit control 81 may be wired in series with only the room thermostat as indicated in Fig. 10. In such case, the limit control will permit operation of the stoker regardless of boiler temperature or pressure.

It should be noted that the transfer impedance device or transformer 87 is used merely to provide for operation of the relay 86 in response to a low voltage room thermostat. If there is no advantage in using a low voltage thermostat the transformer 87 may be dispensed with and the thermostat connected directly across the circuit gap left by the omission of such transformer. In the case of Fig. 8 the ballast resistor 84 is made to have substantially the same impedance as the internal impedance of the transformer 87 so that the voltage drop across the relay 86 and the consequent heating of the relay will be substantially the same regardless of whether the room thermostat 88 or the switch arm 33 is effecting operation of the relay 86. If the room thermostat is used as a high voltage device as shown in Fig. 10 the ballast resistor 84 would have no utility in the position shown in Fig. 8. For this reason the change shown in Fig. 10 is made. If a suitable relay coil were used in Fig. 10 the ballast resistor 84 might be entirely eliminated. In the case of Fig. 8, if an ideal transformer 87 having no internal impedance were available then also the ballast resistor 84 shown there might be dispensed with.

Although it is not essential to the satisfactory operation of the device, it should be noted that applicants prefer to arrange the bimetal element 11 in such a manner that it is not intimately connected with the housing 21 or the metallic ring 13. This is done so that the temperature of the bimetal element 11 may be elevated above that of the housing 21. If the bimetal element 11 were intimately associated with the metallic ring 13 or the housing 21 heat transference from one of the elements to the other would tend to maintain the bimetal element 11 substantially at the same temperature as that of the metallic ring 13 and housing 21 at all times during the heating cycle. In the instant structure when the heater 16 is de-energized, after having caused the bimetal element 11 to have rotated the driver mechanism in a counterclockwise direction so as to disengage the contact 62 from the contact screw 55, the temperature of the bimetal element 11 is elevated above that of the housing 21. This is due to the fact that the heat emanating from the hot wire of the heater 16 traverses the air space between the heater 16 and the bimetal 11 and heats the bimetal 11 by means of direct radiation. Since the bimetal element 11 has very little mass, the heat so received elevates its temperature to a considerable extent. While the bimetal element 11 is heating, the housing member 21 is also heating but since the mass of the housing member 21 is very much greater than that of the bimetal element 11, its temperatures rise is relatively slow with the result that at the termination of the heating period the temperature of the bimetal element 11 is elevated above that of the housing member 21 as before stated. Immediately upon the deenergization of the heater 16 both the housing 21 and the bimetal element 11 start to cool. Now, since the bimetal element 11 is at an elevated temperature with respect to the housing 21 and of low mass, it tends to cool rapidly until it approaches the temperature of the housing member 21 which is cooling slowly, and from that point on the bimetal element 11 and the housing 21 cool together at a relatively slow rate. In effect there is a relatively rapid cooling of the bimetal element 11 for a short period of time until it approaches the temperature of the housing 21 and then there is a relatively slow cooling effect of both the bimetal element 11 and the housing 21 as the housing 21 cools to ambient temperature.

It will be understood that this rapid cooling of the bimetal element 11 occurs during the time that the "on" period is being measured and causes the driver A therefore to move a considerable amount during this time. This arrangement has the advantage of providing appreciable deflection of the driver A with respect to the switch arm member 33 during the "on" period and is conducive to a more accurate measurement of the "on" period and enables the device to be calibrated with ease.

What is claimed is:

1. In a mechanism of the class described for intermittently operating a heating system for regular "on" periods at regular "off" periods, a member oscillating between first and second positions at regular intervals, an actuator for the oscillating member, means for energizing the actuator when said oscillating member is at one of said positions, means for operating said heating system for the duration of said "on" period when said oscillator is at the other of said positions, and means for imparting snap action to the oscillating member in the traverse of the member from the first position to the second position and retarded action in the traverse of the member from the second position to the first position.

2. In a mechanism of the class described for intermittently operating a heating system for regular "on" periods at regular "off" periods, a freely pivoted member oscillating between first and second fixed stops, said fixed stops including means for exerting restraining effort upon said oscillating member whereby a predetermined amount of force is required to move said oscillating member away from said stops, an actuator for motivating the oscillating member, a lost motion connection between said oscillating member and said actuator, including first and second engaging means to effect motion of the oscillating member, one of said engaging means arranged to impart motion to the oscillating member in one direction, and the other of said engaging means arranged to impart motion to the oscillating member in the opposite direction, means for biasing the oscillating member toward one of said engaging means, one of said engaging means arranged to initiate motion of the oscillating member away from said first stop, said biasing means arranged to continue said motion and cause engagement of the oscillating member with said second stop, the other of said engaging means arranged to engage said oscillating member and initiate return motion thereof away from said second stop, a second actuator cooperating with the first actuator, said second actuator arranged to continue said return motion and cause engagement of the oscillating member with said first stop, slow acting driving means for actuating said first and second actuators, control means including the oscillating member for controlling said driving means and effective when the oscillating member engages its first stop to cause movement of the first actuator to shift the oscillating member from its first stop toward its second stop, said control means causing said driving means to actuate the first and second actuators in the opposite direction when the oscillating member is away from said first stop, and control means effective when the oscillating member engages its second stop to cause operation of the heating system.

3. In a burner timer mechanism for intermittently operating a burner to provide alternate "on" and "off" periods each of predetermined duration, the combination of a control member having forward and return movement mounted for oscillation through limited range between a burner operating position and a timer control position, an oscillating actuator having a lost motion actuating connection with said control member, means operable when said actuator acts on said control member through its lost motion in one direction to impart a snap action movement to said control member in its forward movement from said timer control position to its burner operating position, means operable upon said control member when said actuator acts on said control member through its lost motion in the other direction to impart a snap action to said control member away from said burner operating position, means operable by said actuator thereafter in its return movement in said other direction to impart a positive force to said control member to move the control member to said timer control position, a timer for causing movement of said actuator, and control means for said timer and rendered effective when the control member is in its timer control position to cause movement of the control member away from said timer control position.

4. In a burner timer mechanism for intermittently operating a burner to provide alternate "on" and "off" periods each of predetermined duration, the combination of a control member mounted for oscillation through a limited range between a burner control position and a timer control position, an oscillating actuator having a lost motion actuating connection with said control member, a thermal driving means including a heater energized when said control member is in its timer control position and operable when heated to move said actuator in one direction and operable upon cooling to move said actuator in the other direction, means operable when said actuator acts on said control member through its lost motion in one direction to impart a snap action movement to said control member from said timer control position to its burner control position, means operable upon said control member when said actuator acts on said control member through its lost motion in the other direction to impart a snap action to said control member away from said burner control position, and means operable thereafter during return movement of said actuator in said other direction to impart a further force to said control member to move the same to said timer control position.

5. In a burner timer mechanism for intermittently operating a burner to provide alternate "on" and "off" periods each of predetermined duration, the combination of a control member mounted for oscillation through limited range between a burner control position and a timer control position, an oscillating actuator having a lost motion actuating connection with said control member operable in a first direction of movement to impart a first actuating force to said control member to move the same from said burner control position toward said timer control position and thereafter to impart a second actuating force to said control member to move the same to said timer control position, means operable when said actuator acts on said control member through its lost motion in the other direction to impart a snap action movement to said control member from said timer control position to its burner control position, means operable upon said control member when said actuator imparts said first actuating force to said control member through its lost motion in said first direction to impart a snap action to said control member away from said burner control position, said actuator thereafter being operable by the application of said second actuating force in said first direction to move said control member to its timer control position, and timer means acting to oscillate said actuating member and governed by said control member in its timer control position.

6. In a system of the class described for operating a heating device, a burner, a source of power at high potential for operating the burner, a relay for controlling the burner, a pair of contacts actuated by the relay, a circuit extending through said relay contacts for connecting said burner to said source of power, a coil for actuating the relay, a transformer having high and low voltage windings for controlling the energization of said relay coil from a low voltage circuit, a circuit extending through the high voltage winding of said transformer and through said relay coil for actuating said relay, a timing mechanism for automatically operating said relay independent of the action of said transformer, said timing mechanism having two circuit closing positions, an actuating device for the timer, a closed circuit for energizing the actuating device extending therethrough when said timer mechanism is in one of its circuit closing positions, and a closed circuit for energizing the relay extending therethrough when said timer is in the other of said circuit closing positions.

7. In a system of the class described, a timer comprising a switching mechanism and a thermal means for controlling the switching mechanism, said thermal means including a flat spiral bimetal element, a housing for encasing the bimetal element, said housing having a base and walls for associating heat absorbing mass with said bimetal element to retard its action by introducing thermal inertia, a heater proximate to the bimetal element for motivating the same, said heater being located between the inner wall of the housing and the bimetal element and extending laterally of the convolutions thereof, a cover plate for retarding escape of heat from said bimetal and from said heater, a shaft extending through said cover plate for transmitting motion of said bimetal element to said switching mechanism, one of the ends of said bimetal element secured to said housing and the other of the ends of said bimetal element secured to said shaft.

8. In a system of the class described for intermittently operating a heating device for regular "on" periods at regular "off" periods, a timer comprising a member oscillating between first and second stops at regular intervals, an actuator for the oscillating member, means for energizing the actuator when said oscillating member is against one of said stops while deenergizing said actuator when the oscillating member leaves said one stop, means for operating said heating device for the duration of said "on" period when said oscillating member is against the other of said stops, means for adjusting the length of time said oscillating member is against said latter stop whereby the "on" period may be varied, and means for varying the time of oscillation of said oscillating member whereby the "off" period may be varied.

9. In a mechanism of the class described for intermittently operating a heating system for regular "on" periods and regular "off" periods, a freely pivoted member oscillating between first and second fixed stops, said fixed stops including means for exerting restraining effort upon said oscillating member whereby a predetermined amount of force is required to move said oscillating member away from said stops, a driver for motivating the oscillating member, a lost motion connection between said oscillating member and said driver including first and second engaging means to effect motion of the oscillating member, one of said engaging means arranged to impart motion to the oscillating member in one direction, and the other of said engaging means arranged to impart motion to the oscillating member in the opposite direction, means for biasing the oscillating member toward one of said engaging means, one of said engaging means arranged to initiate motion of the oscillating member away from said first stop, said biasing means arranged to continue said motion and cause engagement of the oscillating member with said second stop, the other of said engaging means arranged to engage said oscillating member and initiate return motion thereof away from said second stop, a second driver cooperating with the first driver, said second driver arranged to continue said return motion and cause engagement of the oscillating member with said first stop, said oscillating member and said first stop cooperating while engaged to render the first driver active, and said oscillating member and said second stop cooperating while engaged to cause operation of the heating system for the duration of the "on" period, means for actuating the driver through a prescribed time cycle at predetermined intervals and adjustable means for regulating the degree the first driver is affected by the actuator for varying the period of the prescribed time cycle at which the driver is actuated.

10. A control system for an intermittently operating device, the combination of, control means responsive to the demand for operation of the device for placing the same into and out of operation, timing means comprising a member arranged for oscillation between first and second positions, actuating means for said member arranged to cause movement of said member from the first position toward said second position upon energization thereof and for causing movement of said member from the second position toward the first position upon deenergization thereof, means controlled by said member for energizing said actuating means when the member is in its first position for causing movement of said member toward said second position and for deenergizing said actuating means when the member is in its second position for causing movement thereof toward its first position, means for placing the device into operation when said member is in its second position and for causing said device to be out of operation when the member is in its first position, and means for normally preventing said timing means from placing said device into operation for a substantial period of time after operation of said device by said control means.

11. A control system for a stoker, the combination of, control means responsive to the demand for heat from the stoker for placing the same into and out of operation, timing means comprising a member arranged for oscillation between first and second positions, actuating means for said member arranged to cause movement of said member from the first position toward said second position upon energization thereof and for causing movement of said member from the second position toward the first position upon deenergization thereof, means controlled by said member for energizing said actuating means when the member is in its first position for causing movement of said member toward said second position and for deenergizing said actuating means when the member is in its second position for causing movement thereof toward its first position, means for placing the stoker into operation when the member is in its second position and for causing the stoker to be out of operation when the member is in its first position, and means for preventing energization of said actuating means by said member when the stoker is operated by said control means for normally preventing operation of said stoker by said timing means until a period of time after the stoker is placed out of operation.

12. A timing device comprising, a thermostatic actuator adapted to move in one direction upon rise in temperature and to move in the opposite direction upon fall in temperature, electric heating means for said actuator, means controlling said heating means to cause alternate heating and cooling of said actuator, a control device, means including a first actuating member actuated by said actuator and effective to move said control device from a first position to a second position upon movement of said actuator from one of its positions, and means including a second actuating member actuated by said actuator and effective to move said control device from its second position to a third position upon continued movement of the actuator in the same direction.

13. A timing device comprising, a thermostatic actuator adapted to move in one direction upon rise in temperature and to move in the opposite direction upon fall in temperature, electric heating means for said actuator, a first control means operated by said actuator upon movement thereof from one of its positions to an intermediate position, and a second control means operated by said actuator upon continued movement in the same direction, one of said control means varying the effect of said heating means for cooperating in causing alternate heating and cooling of said actuator.

14. A timing device comprising, a thermostatic actuator adapted to move in one direction upon rise in temperature and to move in the opposite direction upon fall in temperature, electric heating means for said actuator, a switch for controlling said electric heating means, a control device, means actuated upon said actuator reaching a predetermined temperature for substantially simultaneously actuating said control device and said switch in a manner causing reversal in temperature of said actuator, said actuator after a predetermined reversal in temperature thereof causing further actuating of said control device, and upon continued change in temperature in the same direction actuating said switch.

15. In a system for operating a heating device having a burner, a source of power of high potential for operating the burner, a relay for controlling the burner, said relay having a coil and a switch actuated thereby for connecting the burner with the source of power, a first energizing circuit for the relay coil, a thermostatically controlled electric current controlling means for controlling said energizing circuit to start and stop the burner in accordance with the demand for heat, a second circuit for the relay coil in parallel relationship with said first circuit and independent of said electric current controlling means, a timing device for automatically operating said relay independently of said electric current controlling means, said timing device including a movable member and actuating means for shifting said movable member between first and second positions, means including first switching means operated with the movable member for controlling said actuating means and positioned when the movable member is in one of its positions for causing movement thereof to its other position, and means including second switching means operated with the movable member for controlling said second circuit and arranged to cause operation of the burner when the movable member is in said other position.

16. In a system for operating a heating device having a burner, means including a first circuit adapted when closed to cause operation of the burner and when open to permit the burner to stop, thermostatic electric current controlling means for controlling said first circuit to start and stop the burner in accordance with the demand for heat, means including a second circuit adapted when closed to cause operation of the burner independently of said first circuit, burner control switching means for opening and closing said second circuit, slow acting timer means adapted when energized to move from a first position to a second position and adapted when deenergized to return to the first position, said timer means when in its second position causing said burner control switching means to close said second circuit to operate the burner, and means including timer control switching means actuated by said timer means for controlling the same, said second switching means being positioned when the timer means is in its first position for energizing the timer means.

17. In a system for operating a heating device having a burner, means including a first circuit adapted when closed to cause operation of the burner and when open to permit the burner to stop, thermostatic electric current controlling means for controlling said first circuit to start and stop the burner in accordance with the demand for heat, means including a second circuit adapted when closed to cause operation of the burner independently of said first circuit, burner control switching means for opening and closing said second circuit, slow acting timer means adapted when energized to move from a first position to a second position and adapted when deenergized to return to the first position, said timer means when in its second position causing said burner control switching means to close said second circuit to operate the burner, means including timer control switching means actuated by said timer means for controlling the same, said second switching means being positioned when the timer means is in its first position for energizing the timer means, and means including snap action means for causing the timer means to move from its first position to its second position with snap action, and to move slowly toward its first position.

18. A timing device comprising, a thermostatic element having electric heating means therefor, means including switching means positioned upon movement of the thermostatic element due to cooling thereof for energizing said electric heating means and positioned upon movement of the thermostatic element due to heating thereof for deenergizing the electric heating means, to cause the thermostatic element to oscillate between hot and cold positions, spring means for restraining movement of the thermostatic element in cooling direction for increasing the length of time required for movement of the thermostatic element in cooling direction, and adjusting means for said spring means for varying the speed of the timing device.

19. A timing device comprising, a thermostatic element having electric heating means therefor, means including switching means positioned upon movement of the thermostatic element due to cooling thereof for energizing said electric heating means and positioned upon movement of the thermostatic element due to heating thereof for deenergizing the electric heating means, to cause the thermostatic element to oscillate between hot and cold positions, spring means acting on said thermostatic element for varying the length of time required for movement of the thermostatic element in one direction, and adjusting means for said spring means for varying the speed of the timing device.

20. A timing device comprising, a thermostatic element having electric heating means therefor, means including switching means positioned upon movement of the thermostatic element due to cooling thereof for energizing said electric heating means and positioned upon movement of the thermostatic element due to heating thereof for deenergizing the electric heating means, to cause the thermostatic element to oscillate between hot and cold positions, a control device actuated upon movement of the thermostatic element to and from its hot position, adjustable means for retarding movement of the thermostatic element in cooling direction, and means for rendering said retarding means ineffective until after the control device is actuated by cooling movement of the thermostatic element.

21. A timing device comprising, a thermostatic element having electric heating means therefor, means including switching means positioned upon movement of the thermostatic element due to cooling thereof for energizing said electric heating means and positioned upon movement of the thermostatic element due to heating thereof for deenergizing the electric heating means, to cause the thermostatic element to oscillate between hot and cold positions, a control device actuated upon movement of the thermostatic element from one of its positions toward the other position, adjustable means for applying force to said thermostatic element for varying the rate of movement of the same toward said other position, and means for rendering said force applying means ineffective until the control device is actuated.

22. A timing device comprising, a thermostatic element having electric heating means therefor, switching means for intermittently energizing said electric heating means in a manner causing said thermostatic element alternately to move in one direction and then the other, a control device, lost motion type actuating means between the said control device and thermostatic element, and means for adjusting the amount of lost motion.

23. A timing device comprising, a thermostatic actuator having electric heating means therefor, a movable element shiftable between hot and cold positions, lost motion type motion transmitting means between the movable element and thermostatic actuator, means including a switch positioned when the movable element is away from its hot position for energizing the electric heating means, this causing heating of the thermostatic actuator for moving the movable element to its hot position wherein the electric heating means is deenergized, means including snap action mechanism constructed and arranged to impart snap action to the entire movement of the movable element from one of said positions to the other of said positions while permitting a timed movement of said element in the reverse direction, and adjusting means for varying the amount of lost motion provided by said lost motion type motion transmitting means.

24. A timing device comprising, a thermostatic actuator having electric heating means therefor, a movable element shiftable between hot and cold positions, lost motion type motion transmitting means between the movable element and thermostatic actuator, means including a switch positioned when the movable element is away from its hot position for energizing the electric heating means, this causing heating of the thermostatic actuator for moving the movable element to its hot position wherein the electric heating means is deenergized, means including snap action mechanism constructed and arranged to impart snap action to the entire movement of the movable element from one of said positions to the other of said positions while permitting a timed movement of said element in the reverse direction, means for retarding reverse movement of said element through only a portion of its travel, first adjusting means for varying the amount of lost motion provided by the motion transmitting means, and second adjusting means for varying the action of said retarding means.

25. A timing device comprising, a thermostatic actuator having electric heating means therefor and arranged to oscillate between two positions, means including switching means operated by the thermostatic actuator for controlling the electric heating means, and being actuated when the thermostatic actuator is in one of its positions for causing continued movement of the actuator to its other position, said switching means also being constructed and arranged to reverse the temperature change of the thermostatic actuator when in its other position so as to cause return movement of the actuator to said one position, a control device actuated in one manner upon the thermostatic actuator reaching said other position and actuated in the opposite manner upon partial return movement of said thermostatic actuator toward said one position, first adjusting means for varying primarily the degree of temperature reversal of the thermostatic actuator required to effect said partial return movement of the thermostatic actuator for thereby determining the length of time the control device is maintained actuated in said one manner, and second adjusting means for varying primarily the degree of temperature reversal of the thermostatic actuator required to effect the remaining return movement to said one position for varying the time between successive actuations of said control device.

26. A timing device comprising, a thermostatic actuator having electric heating means therefor and arranged to oscillate between two positions, means including switching means operated by the thermostatic actuator for controlling the electric heating means, and being actuated when the thermostatic actuator is in one of its positions for causing continued movement of the actuator to its other position, said switching means also being constructed and arranged to reverse the temperature change of the thermostatic actuator when in its other position so as to cause return movement of the actuator to said one position, a control device actuated in one manner upon the thermostatic actuator reaching said other position and actuated in the opposite manner upon partial return movement of said thermostatic actuator toward said one position, and adjusting means for varying primarily the degree of temperature reversal of the thermostatic actuator required to effect said partial return movement of the thermostatic actuator for thereby determining the length of time the control device is maintained actuated in said one manner.

27. A timing device comprising, a thermostatic actuator having electric heating means therefor and arranged to oscillate between two positions, means including switching means operated by the thermostatic actuator for controlling the electric heating means, and being actuated when the thermostatic actuator is in one of its positions for causing continued movement of the actuator to its other position, said switching means also being constructed and arranged to reverse the temperature change of the thermostatic actuator when in its other position so as to cause return movement of the actuator to said one position, a control device actuated in one manner upon the thermostatic actuator reaching said other position and actuated in the opposite manner upon partial return movement of said thermostatic actuator toward said one position, and adjusting means for varying primarily the degree of temperature reversal of the thermostatic actuator required to effect the remaining return movement to said one position for varying the time between successive actuations of said control device.

LEWIS L. CUNNINGHAM.
HOMER E. MALONE.